United States Patent
Hall et al.

(10) Patent No.: US 7,477,532 B2
(45) Date of Patent: Jan. 13, 2009

(54) METHOD OF FORMING A START-UP DEVICE AND STRUCTURE THEREFOR

(75) Inventors: Jefferson W. Hall, Chandler, AZ (US); Senpeng Sheng, Chandler, AZ (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 454 days.

(21) Appl. No.: 11/205,435

(22) Filed: Aug. 18, 2005

(65) Prior Publication Data

US 2007/0041227 A1     Feb. 22, 2007

(51) Int. Cl.
*H02M 1/00* (2007.01)

(52) U.S. Cl. ............... 363/49; 363/13; 363/50; 363/56; 363/73; 363/56.11

(58) Field of Classification Search ............... 323/901, 323/266, 271, 808; 363/49, 13, 50, 56.04, 363/73, 127, 56.09, 56.11
See application file for complete search history.

(56) References Cited

U.S. PATENT DOCUMENTS

| | | | | |
|---|---|---|---|---|
| 4,740,742 A | * | 4/1988 | Gontowski, Jr. | 323/313 |
| 5,293,077 A | * | 3/1994 | Seki et al. | 307/10.8 |
| 5,477,175 A | | 12/1995 | Tisinger et al. | |
| 6,664,773 B1 | * | 12/2003 | Cunnac et al. | 323/277 |
| 6,775,164 B2 | * | 8/2004 | Wong et al. | 363/147 |
| 6,943,069 B2 | * | 9/2005 | Halamik et al. | 438/186 |
| 2002/0093324 A1 | * | 7/2002 | Juang | 323/316 |
| 2005/0077551 A1 | | 4/2005 | Halamik et al. | |
| 2005/0077933 A1 | | 4/2005 | Sukup et al. | |

* cited by examiner

*Primary Examiner*—Akm E Ullah
*Assistant Examiner*—Nguyen Tran
(74) *Attorney, Agent, or Firm*—Robert F. Hightower

(57) ABSTRACT

In one embodiment, a start-up controller for a PWM power supply controller is formed to generate a current that is substantially constant for changes in temperature and for changes in an output voltage received by the start-up controller.

17 Claims, 3 Drawing Sheets

US 7,477,532 B2

METHOD OF FORMING A START-UP DEVICE AND STRUCTURE THEREFOR

BACKGROUND OF THE INVENTION

The present invention relates, in general, to electronics, and more particularly, to methods of forming semiconductor devices and structure.

In the past, the semiconductor industry utilized various methods and structures to form off-line start-up circuits that received a voltage and formed an output voltage that was used for operating other circuits connected to the start-up circuit. In most cases, the start-up circuit formed a current that was used to charge a capacitor to generate the output voltage. In most cases, the current generated by the start-up circuit could vary if the value of the output voltage changed. Also, the current could change if the ambient temperature changed. As a result, it took much longer to generate the output voltage at high temperatures and than it did at low temperatures. This extra time period made it difficult to design circuits that utilized the output voltage. Additionally, the maximum value of the current typically was two to three (2-3) times the minimum value of the current thereby increasing the difficulty of using the prior off-line start-out circuits.

Accordingly, is desirable to have a start-up circuit that has a current that is stable over a range of temperatures, and that is stable as the value of the output voltage varies.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay between the reaction that is initiated by the initial action.

DETAILED DESCRIPTION OF THE DRAWINGS

Figure 1:
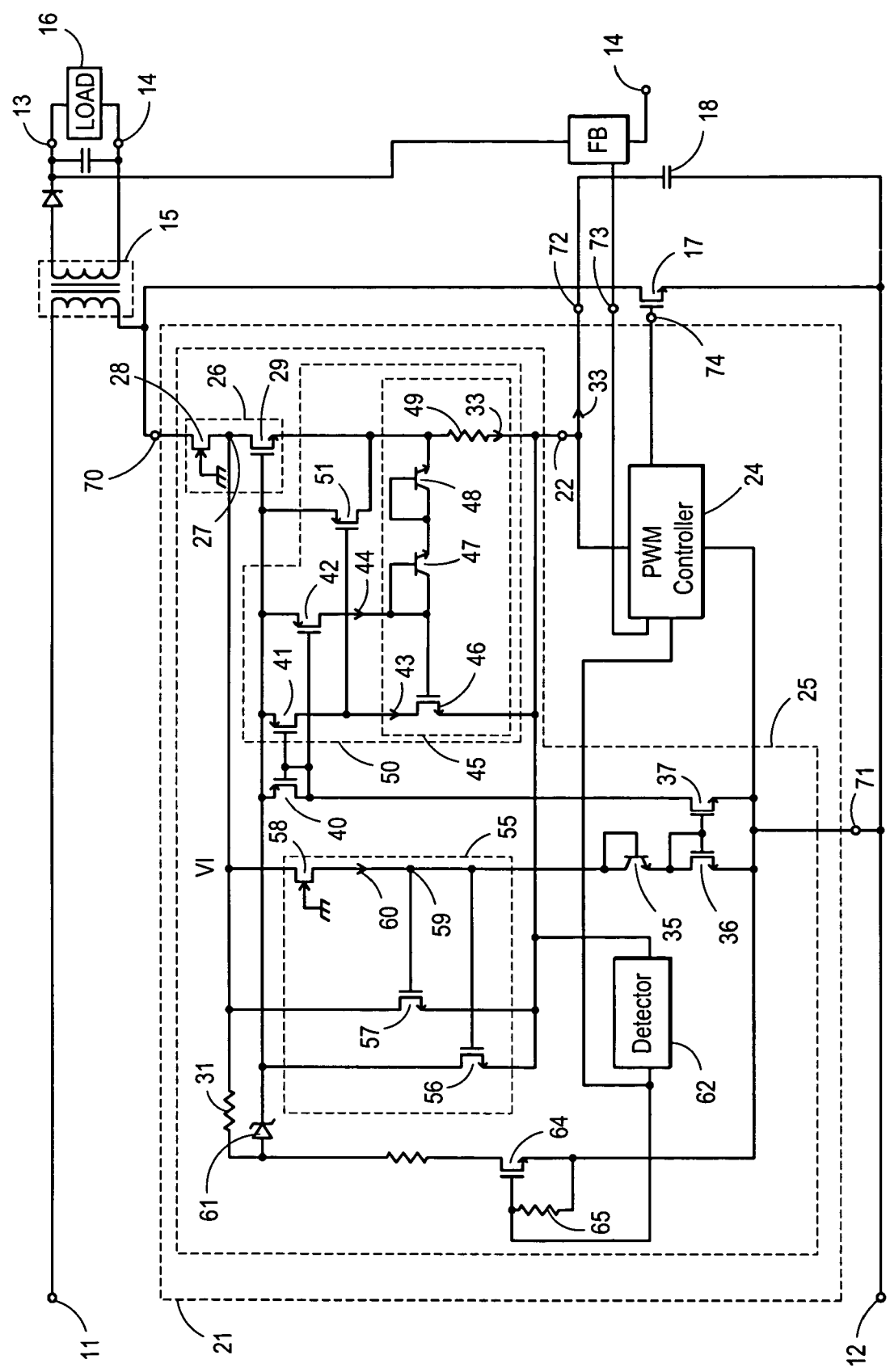
FIG. 1 schematically illustrates an embodiment of a portion of a power supply system having an embodiment of a portion of a start-up controller in accordance with the present invention.

FIG. 1 schematically illustrates an embodiment of a portion of a power control system 10 that uses an embodiment of a power supply controller 21. Power supply controller 21 generally includes an exemplary embodiment of a start-up controller 25 and generally includes other elements such as a pulse width modulated (PWM) controller 24. Start-up controller 25 is formed to receive an input voltage that has a high value and responsively form an operating voltage for operating devices that usually can not operate at the high voltage values of the input voltage, such as PWM controller 24. Controller 25 is configured to control the value of a current that is used to form an operating voltage to power circuits so that controller 21 may provide a smooth controlled start-up. Also, start-up controller 25 forms the current to be substantially constant for changes of temperature and changes of the value of the operating voltage.

System 10 receives an input voltage between a power input terminal 11 and a power return terminal 12, and forms an output voltage between a voltage output 13 and a voltage return 14. A load 16 generally is connected between output 13 and return 14 to receive the output voltage. Other components typically are externally connected to controller 21 in order to provide the desired functions of system 10. For example, an energy storage capacitor 18, a power transistor 17, a transformer 15, and a feedback network (FB) typically are a part of system 10. A rectifying diode and another storage capacitor generally are connected to the secondary side of transformer 15 to assist in forming the output voltage. Load 16 and transformer 15 in addition to the rectifying diode and storage capacitor and feedback network (FB) connected thereto are shown merely to assist in describing the operation of controller 21. Those skilled in the art will understand that other well-known components and functions that are not shown in FIG. 1 typically are included to form a complete power control system. In most embodiments, controller 25 is formed on a semiconductor die and transistor 17, load 16, transformer 15 in addition to the rectifying diode and storage capacitor and feedback network (FB) connected thereto are external to the semiconductor die on which controller 25 is formed. In some embodiments, PWM controller 24, or transistor 17, or a portion of the feedback network (FB) may be another portion of the semiconductor die on which controller 25 is formed.

Controller 25 includes a high voltage startup device 26 that is formed to receive a high voltage on a first terminal and responsively form an intermediate voltage (VI) at an internal node 27 and on a voltage output of device 26, in addition to responsively form a current on a current output of device 26. The high voltage generally can be any voltage that is greater than the voltage which could damage the other electrical elements of controller 21. The high input voltage generally is greater than about fifty volts and may be seven hundred volts or greater. The intermediate voltage (VI) generally is less than about fifty volts and usually is about forty volts or less. Device 26 includes a first JFET 28 and a MOS transistor 29. Such startup devices are well known to those skilled in the art. Examples of suitable elements for device 26 are disclosed in U.S. Pat. No. 5,177,475 issued to Tisinger et al on Dec. 19, 1995, United States patent publication No. 2005/0077551 of inventor Halamik et al published on Apr. 14, 2005, and United States patent publication No. 2005/0077933 of inventor Halamik et al published on Apr. 14, 2005 all of which are hereby incorporated herein by reference. Controller 25 uses the output current from device 26 to provide a controlled current 33 on an output 22 that is used to form the operating voltage. In order to control the value of current 33, controller 21 has a current regulation loop 50 and a protection loop 55. Current regulation loop 50 is used to regulate the value of current 33 and includes a compensation loop 45 plus transistors 41, 42, and 51. Compensation loop 45 assists in maintaining the value of current 33 substantially constant for changes in the value of the input voltage and the operating voltage and also assists in maintaining the value of current 33 substantially constant for temperature changes. Compensation loop 45 includes a sense resistor 49, a control transistor 46, a first compensation diode, formed as a diode coupled bipolar transistor 47, and a second compensation diode, formed as a diode coupled bipolar transistor 48. Resistor 49 preferably is connected in parallel with the first diode, the second diode, and the gate-to source of transistor 46. Protection loop 55 includes a second JFET 58 that is configured as a pinch resistor, and control transistors 56 and 57. JFET 58 sets the gate voltage of transistors 56 and 57.

Device 26 and controllers 21 and 25 receive the high voltage value input voltage between an input 70 and a return 71 of controller 21. Input 70 may be connected directly to terminal 11 or may receive the input voltage through transformer 15. Return 71 typically is connected to terminal 12. Controller 21 generally includes an input/output terminal or output 72 that is used provide current 33 to charge capacitor 18 and form the operating voltage on output 72. During a portion of the operation of controller 25, output 72 forms current 33 as an output and during other portions of the operating, controller 21 receives power from output 72. Controller 21 also generally includes an input 73 for receiving the sense signal from the feedback network (FB), and an output 74 for providing a PWM control signal that is utilized to control transistor 17 and regulate the value of the output voltage between output 13 and return 14.

Controller 25 also generally includes a detector 62, a control transistor 64, and a control resistor 65 that are utilized to sequence the operation of device 26. Detector 62 and transistor 64 control the value of the control voltage applied to transistor 29 to regulate the operating voltage to a desired value. Such detectors and control are well known to those skilled in the art. Controller 21 also includes current mirror connected transistors 36 and 37, a temperature compensation diode, formed as a diode coupled bipolar transistor 35, current mirror connected transistors 40, 41, and 42, and a control transistor 51. Detector 62 receives the operating voltage from output 72 and responsively controls transistor 29 of device 26. Detector 62 usually is formed to receive the operating voltage and responsively enable transistor 64 when the operating voltage is equal to or greater than the desired operating voltage value thereby disabling transistor 29 and current 33. Enabling transistor 64 allows the gate of transistor 29 to be pulled low to disable transistor 29 and disable current 33. The desired operating voltage value formed on output 72 typically is selected to be a value that provides normal operation for the other circuits external to controller 25 such as PWM controller 24.

In operation, as the input voltage at terminal 11 and input 70 begins at zero and increases, the operating voltage at output 72 also begins at zero. Consequently, controller 25 is not operating and there is no output current from device 26. As the input voltage increases, current begins to flow through transformer 15 and into input 70 and into device 26. As the voltage received by device 26 increases, JFET 28 turns-on and supplies a bias current through resistor 31 and diode 61 to transistor 29. Resistor 31 pulls the control input of transistor 29 to the intermediate voltage at node 27 and enables transistor 29 to supply current 33. Current 33 causes a voltage drop across resistor 49 and also begins charging capacitor 18 to form the operating voltage. As the input voltage increases past the pinch-off voltage of JFET 28, JFET 28 clamps node 27, thus the intermediate voltage, to the pinch-off voltage of JFET 28. Current 33 continues to flow to charge capacitor 18.

Current regulation loop 50 regulates the value of current 33. Transistors 46, 47, and 48 allow current 33 to increase until the voltage drop across resistor 49 is substantially equal to the threshold voltage of transistor 46 minus the threshold voltage of transistors 47 and 48 thereby enabling transistor 46. Transistors 46, 47, and 48 control transistor 51 which controls transistor 29 to maintain current 33 at a value so that the voltage drop across resistor 49 is substantially equal to the gate-to-source voltage (Vgs) of transistor 46 minus the emitter-to-base voltage (Vbe) of transistors 47 and 48 thereby keeping the value of current 33 substantially constant. Control loop 50 continues to keep the value of current 33 substantially constant as capacitor 18 is charged to the desired operating voltage value. Keeping current 33 substantially constant as the value of the operating voltage formed on capacitor 18 is changing results in a very predictable time to form the desired value of the operating voltage. Having a very predictable time to achieve the desired value of the operating voltage reduces the design complexity of a system that uses controller 25.

When current 33 has charged capacitor 18 to the desired value of the operating voltage, detector 62 detects the desired operating voltage value and forces the output high to enable transistor 64. Transistor 64 allows the control electrode of transistor 29 to be pulled low thereby disabling transistor 29 and current 33. Diode 61 blocks reverse currents when output 72 is near the desired value of the operating voltage and transistor 64 is turned on to pull the gate of transistor 29 low. Diode 61 preferably is a Schottky diode. If the output voltage on output 72 decreases below the desired operating voltage value of the threshold voltage of detector 62, the output of detector 62 again goes low to disable transistor 64 and re-enable transistor 29 to supply current 33 and once again charge capacitor 18 to the desired operating voltage value.

JFET 58 receives the intermediate voltage from node 27 and forms a current 60 that flows through transistors 35 and 36. The value of current 60 is independent of the value of the operating voltage at output 72. The current mirror configuration of transistors 36 and 37 forms a similar current flowing through transistor 40. The current mirror configuration of transistors 40, 41, and 42 forms a current 44 that flows through transistor 42 and a current 43 that flows through transistors 41 and 46. Due to the current mirror configuration, currents 43 and 44 are also substantially constant. In other embodiments, the ratio of the size of the current mirror transistors may be changed to make currents 43 and 44 ratioed to the value of current 60. Since JFET 58 is operating in the saturated region or saturated operating mode, current 60 is a substantially constant current that is controlled by the impedance of JFET 58. If the value of the operating voltage on output 72 varies, the value of current 60 remains substantially constant. Because current 60 is substantially constant, current 43 that flows through transistor 46 is also substantially constant for changes in the value of the operating voltage on output 72. Because current 43 is substantially constant, the gate-to-source voltage (Vgs) of transistor 46 is also substantially constant even as the value of the operating voltage changes. The voltage drop across resistor 49 is equal to the Vgs of transistor 46, minus the Vbe of transistor 47, minus the Vbe of transistor 48. The Vbe of transistors 47 and 48 are constant with voltage. Since the Vgs of transistor 46 and the Vbe of transistors 47 and 48 is substantially constant as the value of the operating voltage changes, then the voltage drop across resistor 49 is also substantially constant as the value of the operating voltage changes. The constant voltage across resistor 49 forces the value of current 33 to be substantially constant as the value of the input voltage changes and as the value of the operating voltage changes (e.g. increases or decreases).

As the temperature of controller 25 increases, the value of resistor 49 increases and the Vgs of transistor 46 decreases. Also, the Vbe of transistors 47 and 48 decreases with temperature thereby offsetting the decrease in the Vgs of transistor 46 and the increase in the value of resistor 49. In order to keep the value of current 33 substantially constant as the temperature changes, controller 25 is configured to keep the value of currents 60, 43, and 44 substantially constant as the temperature changes. The size of JFET 58 and transistors 35 and 36 are selected to keep the value of current 60 substantially constant as the temperature changes. The current mirror configuration of transistors 36, 37, 41, and 42 ensures that the value of currents 43 and 44 mirror current 60 and remain substantially constant with temperature changes. When the temperature increases, the effective impedance of JFET 58 increases. In order to keep current 60 substantially constant, controller 25 is configured to decrease the voltage on the source of JFET 58 at node 59 to offset the change in the effective impedance of JFET 58. The Vbe of transistor 35 and the Vgs of transistor 36 both decrease with temperature. The value of current 60 and the size of transistors 36 and 37 are selected to ensure that the Vbe variation of transistor 35 and the Vgs variation of transistor 36 with temperature at the value of current 60 offsets the variation of the impedance of JFET 58. Those skilled in the art will appreciate that opposite changes occur for a decrease in temperature.

The goal is to configure controller 25 so that current 33 is constant for changes in the operating voltage on output 72 and for changes in temperature. However, as is well known in the art there are always minor variances that prevent the elements from maintaining exactly constant voltages. It is well established in the art that variances of up to about ten per cent (10%) are regarded as reasonable variances from the ideal goal of exactly constant.

It is believed that compensation loop 45 maintains current 33 within about ten percent (10%) for operating voltage changes from approximately 0.5 Volts to values greater than the maximum value of the operating voltage. In one example embodiment, current 33 changed less than ten percent for operating voltage changes between approximately 0.5 and 12.8 Volts. Also, the temperature compensation keeps current 33 within about ten percent (10%) from temperature changes between about minus forty to plus one hundred twenty five degrees Celsius. In the preferred embodiment, the total variation of current 33 over temperature and operating voltage variations is no greater than about ten percent (10%).

In one example embodiment, the value of current 60 is formed to be about 2.5 micro-amps at room temperature, transistor 35 is formed to have a Vbe of approximately 0.75V at room temperature, and the Vgs of transistor 36 is formed to be approximately two volts at room temperature. Additionally, the gate width of transistors 36 and 37 was approximately twenty microns. In this example embodiment, transistors 36 and 37 were LDMOS transistors.

Protection loop 55 is formed to prevent damaging device 26 and controller 25 if output 72 is shorted to terminal 12. If output 72 is pulled low, the source of transistors 56 and 57 are substantially at the voltage of terminal 12, but the gate of transistors 56 and 57 are clamped to a voltage that is substantially equal to the Vgs of transistor 36 plus the Vbe of transistor 35 thereby enabling transistors 56 and 57. Enabling transistor 56 pulls the gate of transistor 29 low thereby disabling transistor 29 and disabling current 33. When transistor 29 is disabled, current is applied to output 72 from node 27 through transistor 57 and also through resistor 31, diode 61, and transistor 56. The current supplied from device 26 through transistors 56 and 57 typically is a small value of current compared to the value of current 33. For example, transistors 56 and 57 may supply approximately two hundred (200) micro-amperes which is much smaller than the typical five (5) milli-amperes supply applied by current 33. This value of current supplied by transistors 56 and 57 is small enough to not cause damage to device 26 but is large enough to begin charging capacitor 18 once the short on output 72 is removed. Once the short is removed from output 72, the current from transistors 56 and 57 charge capacitor 18 until the voltage on output 72 is large enough to disable transistors 56 and 57 thereby allowing current regulation loop 50 and detector 62 and transistor 64 to control the operation of device 26.

In order to facilitate the operation of controller 25, an input of device 26 is connected to input 70 and a current output of device 26 is commonly connected to the drain of transistor 51, an emitter of transistor 48, and a first terminal of resistor 49. A voltage output or node 27 of device 26 is commonly connected to a drain of JFET 58, a first terminal of resistor 31, a drain of transistor 57, and a drain of JFET 58. A control input of device 26 or gate of transistor 29 is commonly connected to a source of transistor 51, a source of transistor 42, a source of transistor 41, a source of transistor 40, a drain of transistor 56, and a cathode of diode 61. An anode of diode 61 is commonly connected to a second terminal of resistor 31, and a drain of transistor 64 through a resistor. A gate of transistor 64 is commonly connected to a first terminal of resistor 65 and the output of detector 62. A source of transistor 64 is commonly connected to a second terminal of resistor 65 and return 71. A source of transistor 56 is commonly connected to a source of transistor 57, a source of transistor 46, a second terminal of resistor 49, output 72, and output 22 of controller 25. A gate of transistor 57 is commonly connected to the source of JFET 58, a gate of transistor 56, and a base and a collector of transistor 35. An emitter of transistor 35 is commonly connected to a drain of transistor 36 and a gate of transistors 36 and 37. A source of transistor 36 is commonly connected to return 71 and a source of transistor 37. A drain of transistor 37 is commonly connected to a drain of transistor 40, the gate of transistors 40 and 41, and a gate of transistor 42. A drain of transistor 41 is commonly connected to a gate of transistor 51 and a drain of transistor 46. A gate of transistor 46 is commonly connected to a drain of transistor 42 and a base and a collector of transistor 47. An emitter of transistor 47 is commonly connected to a collector and a base of transistor 48.

Figure 2:
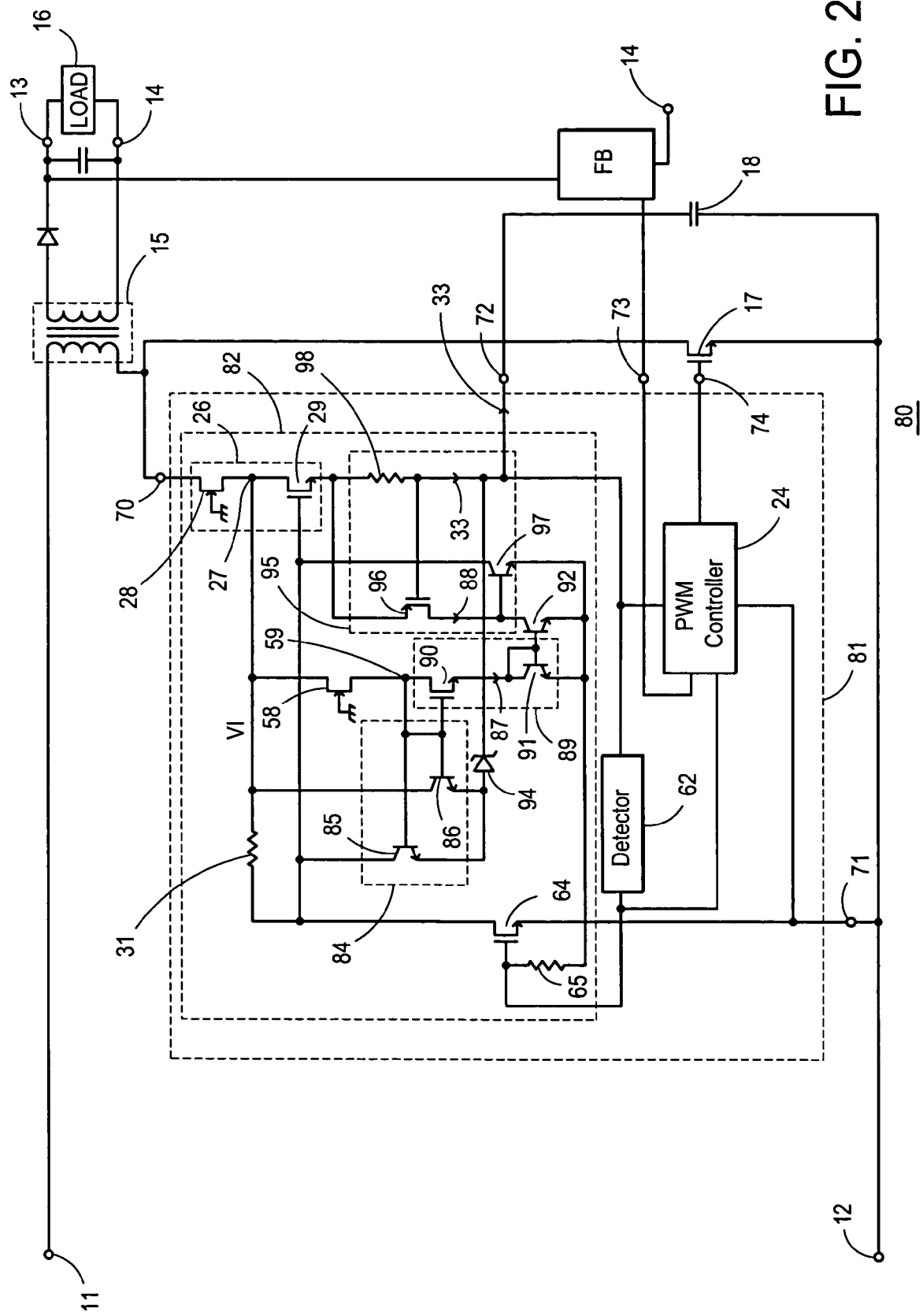
FIG. 2 schematically illustrates an embodiment of a portion of another power supply system having another embodiment of a portion of a start-up controller in accordance with the present invention.

FIG. 2 schematically illustrates an embodiment of a portion of a power control system 80 that is an alternate embodiment of system 10. System 80 includes uses an embodiment of a power supply controller 81 that is an alternate embodiment of controller 21. Controller 81 includes an exemplary embodiment of a start-up controller 82 that is an alternate embodiment of controller 25 explained in the description of FIG. 1. Controller 82 includes a current regulation loop 95, a protection loop 84, and a compensation loop 89. Controller 82 also includes a Schottky diode 94. Current regulation loop 95 includes a current sense resistor 98, a control transistor 96, and a bipolar transistor 97. Protection loop 84 includes bipolar transistors 85 and 86. Compensation loop 89 includes a transistor 90 and a bipolar transistor 91 that is connected in a current mirror configuration with a transistor 92.

Loop 95 regulates the value of current 33. Resistor 98 is formed in parallel with the gate and source of transistor 96. As current 33 flows through resistor 98, it forms the Vgs of transistor 96. Transistor 96 controls the base current of transistor 97 which controls the gate voltage of transistor 29. As current 33 increases (or decreases), transistors 96 and 97 control transistor 29 to decrease (or increase) the gate voltage of transistor 29 and regulate the value of current 33.

JFET 58 receives the intermediate voltage from node 27 and forms a current 87 that flows through transistors 90 and 91. The value of current 87 is independent of the value of the operating voltage. The current mirror configuration of transistors 91 and 92 forms a current 88 flowing through transistor 96 that is substantially equal to current 87. In other embodiments, the ratio of the size of the current mirror transistors may be changed to make current 88 ratioed to the value of current 87. Since JFET 58 is a JFET operating in the saturated region or saturated operating mode, current 87 is a substantially constant current that is controlled by the impedance of JFET 58. If the value of the operating voltage on output 72 varies, the value of current 87 remains substantially constant. Because current 87 is substantially constant, current 88 that flows through transistor 96 is also substantially constant for changes in the value of the input voltage. Because current 88 is substantially constant, the gate-to-source voltage (Vgs) of transistor 96 is also substantially constant even as the value of the operating voltage changes. The voltage drop across resistor 98 is equal to the Vgs of transistor 96. Since the Vgs of transistor 96 is substantially constant as the value of the operating voltage changes, then the voltage drop across resistor 98 is also substantially constant as the value of the input voltage changes. The substantially constant voltage across resistor 98 forces the value of current 33 to be substantially constant as the value of the operating voltage changes.

As the temperature of controller 82 increases, the value of resistor 98 increases and the Vgs of transistor 96 increases. So the resistance change and the Vgs change somewhat offset each other. The Vgs of transistor 90 and the Vbe of transistor 91 both decrease with increasing temperature and so the source voltage of JFET 58 at node 59 decreases with increasing temperature to keep current 87, thus current 88, substantially constant with increasing temperature. Those skilled in the art will appreciate that opposite changes occur for a decrease in temperature.

In order to facilitate this operation of controller 82, a first terminal of resistor 31 is commonly connected to node 27, the drain of JFET 58, and a collector of transistor 86. A second terminal of resistor 31 is commonly connected to a collector of transistor 85, the gate of transistor 29, a collector of transistor 97, and the drain of transistor 64. The source of transistor 64 is connected to return 71. The gate of transistor 64 is connected to the first terminal of resistor 65 and the output of detector 62. The second terminal of resistor 65 is commonly connected to an emitter of transistor 91, an emitter of transistor 92, and an emitter of transistor 97. A collector of transistor 91 is commonly connected to the base of transistors 91 and 92, and a source of transistor 90. A drain of transistor 90 is commonly connected to node 59, the source of JFET 58, a gate of transistor 90, a base of transistor 86, and a base of transistor 85. An emitter of transistor 85 is commonly connected to an emitter of transistor 86 and an anode of diode 94. A cathode of diode 94 is commonly connected to a first terminal of resistor 98, a gate of transistor 96, output 72, and an output 83 of controller 82. A collector of transistor 92 is connected to a base of transistor 97 and drain of transistor 96. A source of transistor 96 is connected to a second terminal of resistor 98 and the voltage output of device 26.

Figure 3:
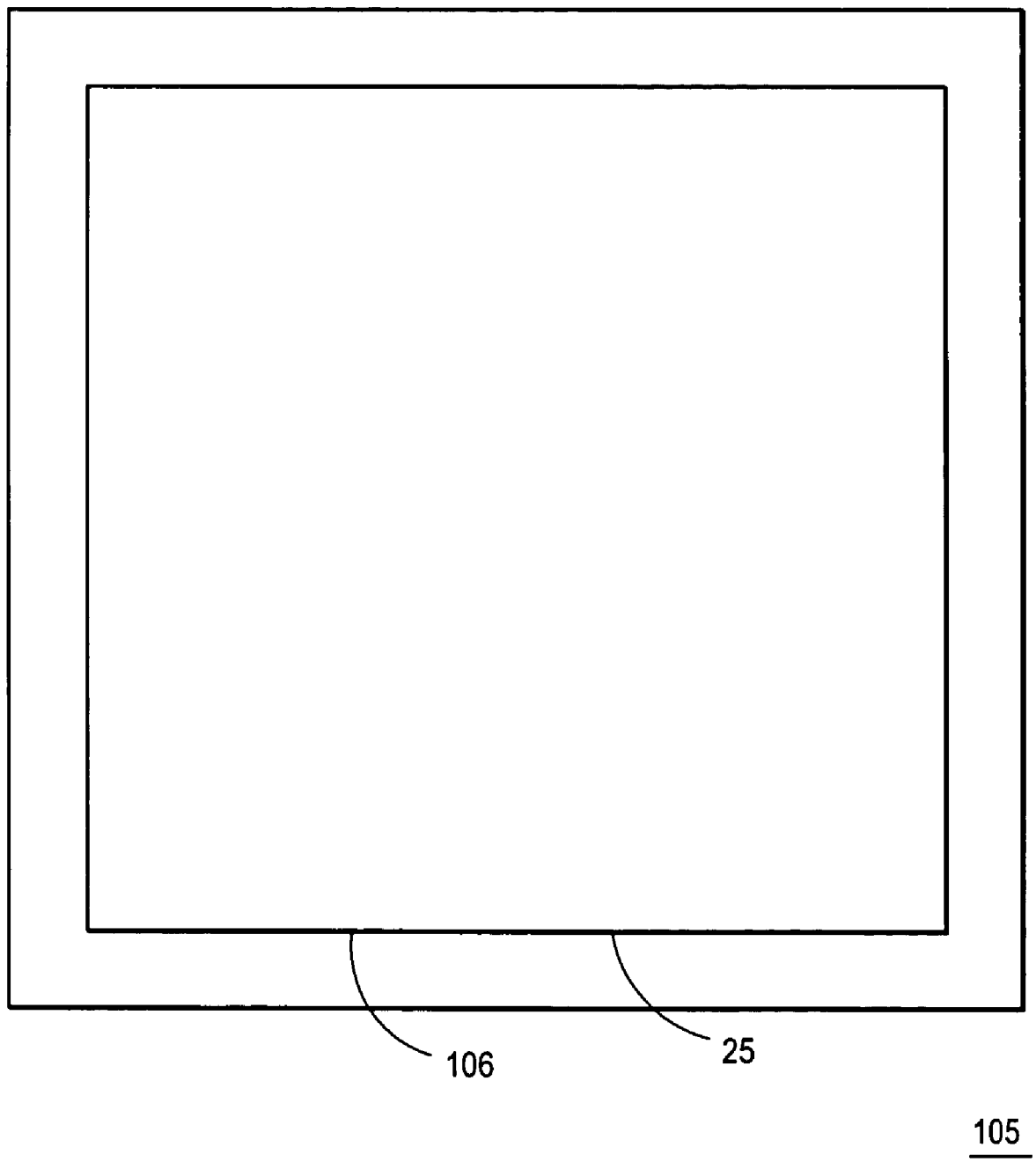
FIG. 3 schematically illustrates an enlarged plan view of a semiconductor device that includes the assert-up controller of FIG. 1 in accordance with the present invention.

FIG. 3 schematically illustrates an enlarged plan view of a portion of an embodiment of a semiconductor device 105 that is formed on a semiconductor die 106. Controller 25 is formed on die 106. Die 106 may also include other circuits that are not shown in FIG. 3 for simplicity of the drawing. Controller 25 and device 105 are formed on die 106 by semiconductor manufacturing techniques that are well known to those skilled in the art.

In view of all of the above, it is evident that a novel device and method is disclosed. Included, among other features, is forming loops 45 and 95 to form current 33 substantially constant for changes in the value of the operating voltage formed on output 72 and to be substantially constant for changes in the ambient temperature of controllers 25 and 82. Forming current 33 to be substantially constant reduces the design parameters that a designed has to consider when using controllers 25 and 82 to form an operating voltage for a circuit.

While the subject matter of the invention is described with specific preferred embodiments, it is evident that many alternatives and variations will be apparent to those skilled in the semiconductor arts. For example, start-up controllers 25 and 82 have been described as a portion of respective power supply controllers 21 and 81, however, those skilled in the art will appreciate that controllers 21 and 82 may be formed to generate and control the charging current to form an operating voltage for any circuit that receives a high voltage and needs to form an operating voltage at a lower value. More specifically the subject matter of the invention has been described for particular bipolar and MOS transistor structures, although the method is directly applicable to other transistors, as well as to MOS, BiCMOS, metal semiconductor FETs (MESFETs), HFETs, and other transistor structures. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A voltage start-up circuit comprising:
   a high voltage element having an input for receiving an input voltage, a first output configured to form an intermediate voltage from the input voltage, and a second output configured to form a first current;
   a first transistor coupled to receive a substantially constant current derived from the intermediate voltage, the first transistor having a first current carrying electrode coupled to receive the substantially constant current, a control electrode, and a second current carrying electrode;
   a first resistor configured to receive the first current;
   a first diode coupled bipolar transistor that is coupled between the first transistor and the first resistor, the first diode coupled bipolar transistor having a collector and a base coupled to the control electrode of the first transistor, and an emitter; and
   a second diode coupled bipolar transistor that is coupled between the first resistor and the first transistor, the second diode coupled bipolar transistor having a collector and an base coupled to the emitter of the first bipolar transistor and an emitter coupled to a first terminal of the first resistor.

2. The voltage start-up circuit of claim 1 including a first JFET transistor coupled to receive the intermediate voltage and operate in a saturation mode and responsively generate a second current that is substantially constant.

3. The voltage start-up circuit of claim 2 further including a first current mirror coupled to receive the second current and responsively form a third current that is ratioed to the second current.

4. The voltage start-up circuit of claim 3 further including a second current mirror coupled to receive the third current and responsively form the substantially constant current.

5. The voltage start-up circuit of claim 1 wherein the high voltage element includes a first JFET transistor coupled at a common node to a first MOS transistor wherein the first JFET transistor receives the input voltage, the first MOS transistor receives the intermediate voltage and forms the first current, and the high voltage element forms the intermediate voltage at the common node.

6. The voltage start-up circuit of claim 1 wherein the first transistor is coupled to receive a control voltage that is representative of the first current and wherein the first transistor is coupled to control the high voltage element to maintain the first current substantially constant.

7. A method of forming a start-up controller comprising:
configuring a high voltage element to receive an input voltage and responsively form an intermediate voltage on a first output and form a first current on a second output;
configuring the start-up controller to use the first current to form an output voltage;
configuring a first transistor to receive the intermediate voltage and form a second current having a first value;
configuring a second transistor and a third transistor in series to both conduct the second current wherein the first transistor, the second transistor, and the third transistor are configured to have voltage drops as a function of temperature that maintains the second current substantially constant for temperature changes; and
configuring a first control circuit to maintain the first current substantially constant for changes of the output voltage.

8. The method of claim 7 wherein configuring the first transistor to receive the intermediate voltage includes configuring the first transistor as a JFET transistor that operates in a saturation mode at the intermediate voltage.

9. The method of claim 7 further including maintaining the second current substantially constant for temperature changes between approximately −40 and +125 degrees Celsius.

10. The method of claim 7 wherein configuring the first transistor and the second transistor to receive the second current includes configuring a diode coupled bipolar transistor to receive the second current and an MOS transistor coupled to receive the second current from the diode coupled bipolar transistor.

11. The method of claim 7 wherein configuring the first control circuit to maintain the first current substantially constant for changes of the output voltage includes coupling a first resistor to receive the first current, and coupling a gate-to-source voltage of an MOS transistor and a base emitter voltage of a first bipolar transistor in parallel with the first resistor.

12. The method of claim 11 further including coupling a base emitter voltage of a second bipolar transistor in series with the base emitter voltage of the first bipolar transistor.

13. A method of forming a start-up controller comprising:
configuring a first circuit to receive an input voltage and form an intermediate voltage including configuring a first transistor of the first circuit to form a first current;
configuring a control circuit to receive the first current from the first transistor;
configuring the control circuit to couple the first current to form an output voltage of the start-up controller;
configuring a second circuit to receive the intermediate voltage and form a second current that is substantially constant for variations of the output voltage, including configuring a second transistor and a third transistor in series to both conduct the second current wherein the second transistor and the third transistor are configured to have voltage drops as a function of temperature that maintains the second current substantially constant for temperature changes; and
configuring a control transistor of the control circuit to receive the second current that is substantially constant for variations of the output voltage and to control the first transistor to maintain the first current substantially constant for variations of the output voltage.

14. The method of claim 13 wherein configuring the first circuit having the first transistor includes configuring a high voltage element to form the first current wherein the first transistor is a portion of the high voltage element.

15. The method of claim 13 wherein configuring the first circuit to receive the input voltage includes configuring a J-FET to receive the input voltage to form the intermediate voltage and further including coupling the J-FET to the first transistor.

16. The method of claim 13 further including coupling a first resistor to receive the first current from the first transistor; coupling a first diode to the first transistor and to the first resistor; coupling a second diode to the first diode; and coupling the control transistor to the second diode and to receive the second current.

17. The method of claim 16 further including coupling a first current carrying electrode of the control transistor to receive the second current wherein the control transistor also has a control electrode, and a second current carrying electrode;
configuring the first diode as a first bipolar transistor having a collector and a base coupled to the control electrode of the control transistor, and an emitter; and
configuring the second diode as a second bipolar transistor having a collector and an base coupled to the emitter of the first bipolar transistor and an emitter coupled to a first terminal of the first resistor.

* * * * *